United States Patent [19]
Yasumura

[11] Patent Number: 5,216,585
[45] Date of Patent: Jun. 1, 1993

[54] SWITCHING POWER SOURCE DEVICE

[75] Inventor: Masayuki Yasumura, Kanagawa, Japan

[73] Assignee: Sony Corporation, Tokyo, Japan

[21] Appl. No.: 871,760

[22] Filed: Apr. 21, 1992

[30] Foreign Application Priority Data

May 1, 1991 [JP] Japan .................. 3-126476

[51] Int. Cl.$^5$ ............................. H02M 3/338
[52] U.S. Cl. ............................ 363/19; 363/23
[58] Field of Search ................. 363/18–25, 363/133

[56] References Cited

U.S. PATENT DOCUMENTS 4,361,865 11/1982 Shono .................. 363/19
4,736,283 4/1988 Yasumura ............. 363/19

Primary Examiner—Emanuel T. Voeltz
Attorney, Agent, or Firm—Lewis H. Eslinger; Jay H. Maioli

[57] ABSTRACT

A switching power source device includes a rectifying smoothing circuit made up of a full-wave rectifier 2 and a small-capacity capacitor 3, a resonance frequency controlled type resonance converter circuit 4 having a controlled resonance frequency, a power source regulating transformer 7 having a primary winding $N_1$, a secondary winding $N_2$ insulated from the primary winding $N_1$, and a control winding at right angles to the primary and secondary windings, a controller 9 for controlling the controlling current of the power source regulating transformer 7 and a rectifying smoothing capacitor 8 determining the ripple voltage of the dc output voltage from the power source regulating transformer 7 in conjunction with the load power. With the switching power source device, the harmonic distortion in the ac input current is diminished and the ac input voltage is improved to a sinusoidal wave.

2 Claims, 7 Drawing Sheets

SWITCHING POWER SOURCE DEVICE

BACKGROUND OF THE INVENTION

1. Field of the Invention

This invention relates to a switching power source device capable of inhibiting harmonic distortion of a, ac power source.

2. Description of the Prior Art

Heretofore, as countermeasures for diminishing the harmonic distortion of a commercial ac input power source, an ac reactor inserting system, an active smoothing filter system and a transformer system, have been considered, as stated in "DENKI KYODO KENKYU", vol. 46, No. 2.

By the above-mentioned ac reactor inserting system is meant a system in which an ac reactor is inserted into an ac input side of a full-wave rectifier-capacitor smoothing circuit, a typical component used in general-purpose household electric equipment, for limiting the charging current to a capacitor by an impedance component of the ac reactor for diminishing high harmonic components by extending an angle of conduction.

By the above-mentioned active smoothing filter system is meant a system in which a booster type chopper converter, a non-insulator type switching regulator having an output voltage higher than an input voltage, is used in place of the above-mentioned full-wave rectifier-capacitor smoothing circuit. In operation, pulse signals, full-wave rectified by a bridge rectifier, are switched over an entire period at a frequency higher than several tens of kilohertzes. The result is that the input current waveform is averaged out for each of the periods of the switching current, such that, if a large capacitor be present in a load, such capacitor proves to be a resistance load, so that the input switching current is caused to flow sinusoidally to allow to diminish the high harmonics.

Finally, by the transformer type system is meant a system in which reduction of high harmonics may be achieved by the choking effects proper to the transformer and the enlarged current conduction angle due to the lower secondary side voltage.

However, the above-mentioned three conventional systems suffer from respective drawbacks.

With the ac reactor inserting system, the reactor device is bulky and heavy in weight, while being expensive. An ac reactor is expensive when compared to other components. Since the dc voltage derived from smoothing of the corresponding ac voltage is lowered so that redesigning in a downstream side switch regulator becomes necessary to lower the efficiency. Besides, electronic appliances may be affected by the stray magnetic flux from the reactor device.

With the above-mentioned active smoothing filter system, the noise level is increased due to electro-magnetic interference (EMI) derived from switching semiconductors. Circuitry becomes complicated due to switching controlling means for providing for an input voltage proportionate to an input electric current, starting circuit and to software functions, besides the function as a switching power source, thereby increasing the number of component parts and production costs. Insulation must be made by a downstream side switching regulator because the system is a non-insulated system.

Although the transformer system is limited to a small-capacity electronic equipment of less than 30 W, the equipment is increased in size in order to be commercialized.

If the defects of the three systems is inspected, it becomes apparent that, in view of avoiding the increase in size of the device, the ac reactor inserting system or the transformer system is not satisfactory under the current state of the art in respect of practical application. However, the active smoothing filter may lend itself to practical application, if integration of the active smoothing filter and the switching filter is achieved satisfactorily.

With the active filter circuit employing the above-mentioned active smoothing filter circuit, the circuitry is such that, as disclosed in "DENSHI GIJUTSU" extra issue of March 1990, a non-insulated booster chopper circuit is of a pulse width modulation (PWM) system with a fixed switching frequency or of a ringing choke converter (RCC) system with a variable switching frequency. The active filter circuit has a drawback that, since the switching semiconductor undergoes a repeated on-off switching operations with trapezoidal or triangular waves so that the electro-magnetic wave interference level derived from the semiconductors is increased. The active filter circuit also has drawbacks that, if the system is of an insulated type, it becomes a flyback converter to increase power losses and noise levels, while the circuitry becomes complex due to provision of a starting circuit, software functions and means for providing for the input voltage proportionate to the input current, besides the function of the switching power source, thus leading to increased number of component parts and increased costs.

With the switching power source system for suppressing the ac ripple voltage to less than 50 mV against load fluctuations and changes in the ac input voltages for maintaining a constant dc output voltage, a large capacity electrolytic capacitor is employed as an ac input rectifying smoothing capacitor. If, however, the load power is 150 W and the capacitor for ac input rectification has a capacitance of 820 µF, the ac line current containing a large quantity of high harmonics charging the capacitor will flow as indicated in FIG. 2 to produce waveform distortions of the commercial sinusoidal ac voltage, such that the power factor is as low as 0.5 to 0.7.

OBJECT AND SUMMARY OF THE INVENTION

In view of the above-depicted status of the art, it is an object of the present invention to provide an arrangement in which the active filter circuit is constituted by a switching power source system by a resonance frequency controlling type resonant converter circuit having a fixed switching frequency for improving the power factor.

The present invention provides a switching power source device comprising a rectifying smoothing circuit including a small-capacity capacitor as a circuit for rectifying and smoothing a commercial ac input power source, a resonant frequency controlled type resonant converter circuit including a self-oscillating circuit for switching controlling of an output of said rectifying smoothing circuit with a fixed switching frequency, a transformer circuit section including a primary circuit supplied with an output of said resonance converter circuit, a secondary winding insulated with respect to said primary winding, and a control winding having the direction of winding at right angles to the winding direction of said primary and secondary windings, a controller for controlling the control current of said control winding of said transformer circuit section in a direction of rendering the average value of the dc output voltage of said transformer circuit section constant, and a rectifying smoothing circuit including a rectifying smoothing capacitor determining the ripple voltage of the dc output voltage of said transformer circuit section in conjunction with a load power.

With the switching power source device according to the present invention, the power factor may be improved by the active smoothing filter constituted by the resonance frequency controlled type resonance converter circuit and the rectifying smoothing circuit employing the small capacity capacitor for reducing the harmonic distortion of the commercial power source. The electro-magnetic interference emanating from the switching semiconductor is of a lower level as compared to the conventional ringing choke converter (RCC) or pulse width modulation (PWM) type converter circuit, and the minute controlling current for the power source regulating transformer is generated by a self-oscillating type controller, for diminishing the production costs. In addition, The primary and secondary windings of the power source regulating transformer can be insulated from each other so that the downstream side regulator may remain non-insulated to enable the device to be reduced in size. The dc output voltage at the secondary side of the power source regulating transformer may be optionally selected by the turn ratio of the power source regulating transformer.

DESCRIPTION OF THE PREFERRED EMBODIMENTS

Figure 1:
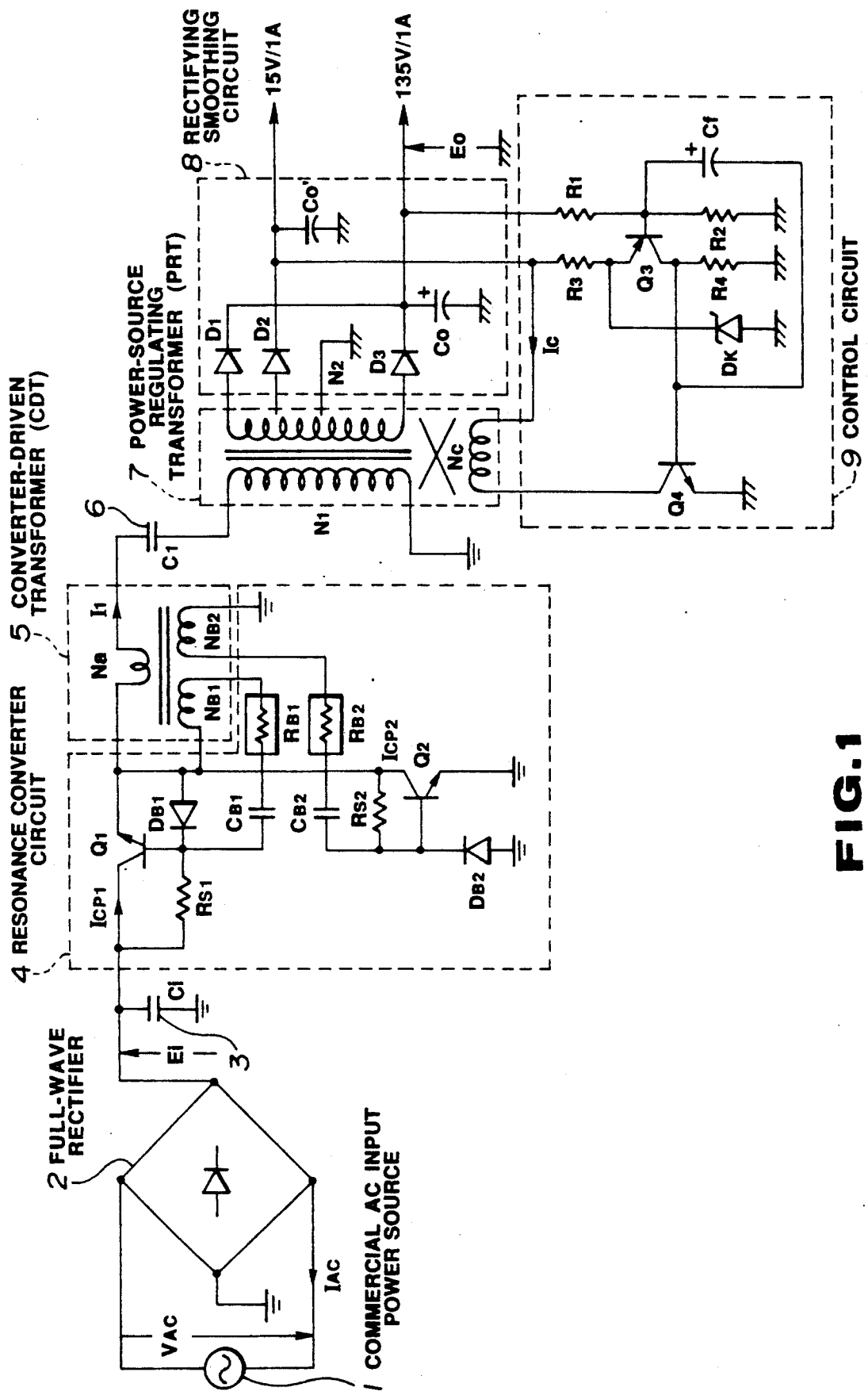
FIG. 1 is a circuit diagram showing a switching power source device for improving the power factor according to an embodiment of the present invention.
Figure 2:
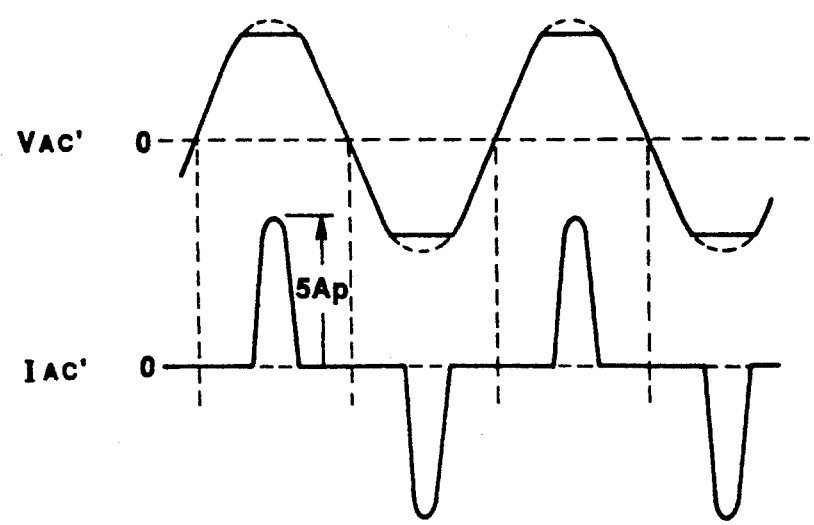
FIG. 2 is a waveform diagram showing the waveforms of the ac line currents and the commercial ac voltages when a large capacitance electrolytic capacitor is used as an ac input rectifying smoothing capacitor of a conventional switching power source device.

Referring to the drawings, certain preferred embodiments of the present invention will be explained in detail.

FIG. 1 is a circuit diagram showing a switching power source device for improving the power factor according to an embodiment of the present invention.

Referring to FIG. 1, a dc input power source is produced by rectifying and smoothing a commercial ac input power source 1 with a diode bridge type full-wave rectifier 2 and a small-capacitance capacitor 3.

This dc input power source is supplied via a primary winding $N_a$ of a converter-driven transformer 5 to a dc resonance circuit consisting of a capacitor 6 and stray inductance of a primary winding $N_1$ (see also FIGS. 5 and 6) of a power source regulation transformer 7.

The converter-driven transformer 5 has the primary winding $N_a$ and two secondary windings $N_{B1}$, $N_{B2}$. Associated with these secondary windings $N_{B1}$, $N_{B2}$ is a resonance converter circuit 4 for on-off control of the current of the above-mentioned dc input power source.

The resonance converter circuit 4 is composed of a series connection of a switching transistor $Q_1$, having a diode $D_{B1}$ connected across its emitter and its base, and a switching transistor $Q_2$, having a diode $D_{B2}$ connected across its base and the ground. The transistor $Q_1$ is connected across the dc input power source and the input winding $N_a$ of the converter-driven transformer 5, while the transistor $Q_2$ is connected across the primary winding $N_a$ of the converter-driven transformer 5 and the ground. A dc resonance circuit of a secondary winding $N_{B1}$ of the converter-driven transistor 5, a resistor $R_{B1}$ and a capacitor $C_{B1}$ is connected in parallel with the diode $D_{B1}$ across the base and the emitter of transistor $Q_1$, while a dc resonance circuit of a secondary winding $N_{B2}$ of the converter-driven transistor 5, a resistor $R_{B2}$ and a capacitor $C_{B2}$ is connected in parallel with the diode $D_{B2}$ across the collector of transistor $Q_2$ and the ground. A starter resistor $R_{S1}$ is connected across the dc input power source and the base of the switching transistor $Q_1$, while a starter resistor $R_{S2}$ is connected across the collector and the base of the switching transistor $Q_2$.

Figure 5:
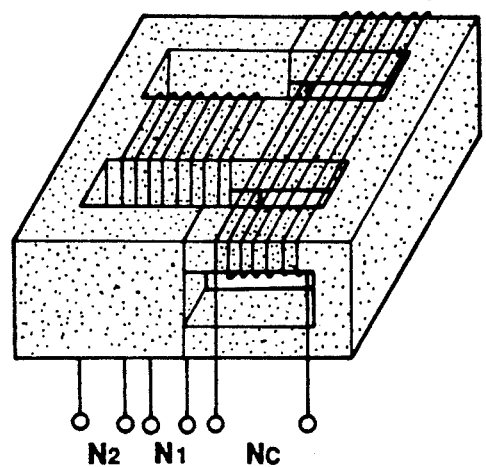
FIG. 5 is a perspective view showing the construction of a power source regulating transformer employed in the embodiment shown in FIG. 1.
Figure 6:
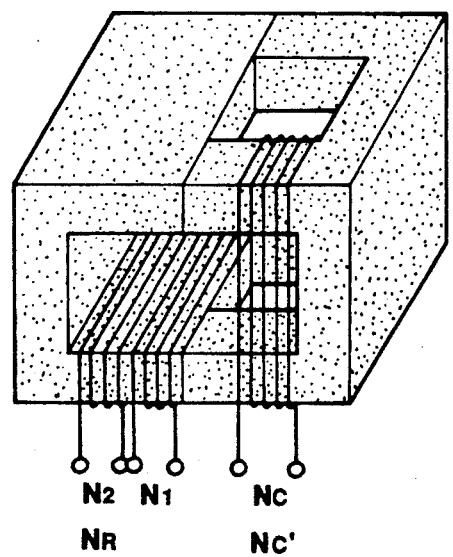
FIG. 6 is a perspective view showing the construction of a power source regulating transformer according to a modified embodiment of the present invention.

The power source regulating transformer 7 has the primary winding $N_1$ and a secondary winding $N_2$, insulated from the primary winding, as well as a control winding $N_C$, which is wound in a direction normal to the winding direction of the windings $N_1$ and $N_2$ (see also FIGS. 5 and 6). The secondary winding $N_2$ of the power source regulating transformer 7 is connected to a rectifying smoothing circuit 8 including diodes $D_1$, $D_2$ and $D_3$ and smoothing capacitors $C_0$, $C_0'$. A dc output voltage of the rectifying smoothing circuit 8 is converted by a controller 9 into a controlling current which is supplied to the control winding $N_C$ (see also FIGS. 5 and 6) of the power source regulating transformer 7.

The controller 9 includes a transistor $Q_3$, to the base of which the above-mentioned dc output voltage is supplied via voltage dividing resistors $R_1$, $R_2$, a resistor $R_3$ connected to the emitter of this transistor $Q_3$, a Zener diode $D_K$, as reference voltage, connected to the emitter of the transistor $Q_3$, a transistor $Q_4$ the base of which is connected to the collector of the transistor $Q_3$ together with a resistor $R_4$ and a feedback capacitor $C_f$ connected across the bases of the transistors $Q_3$, $Q_4$.

Figure 3:
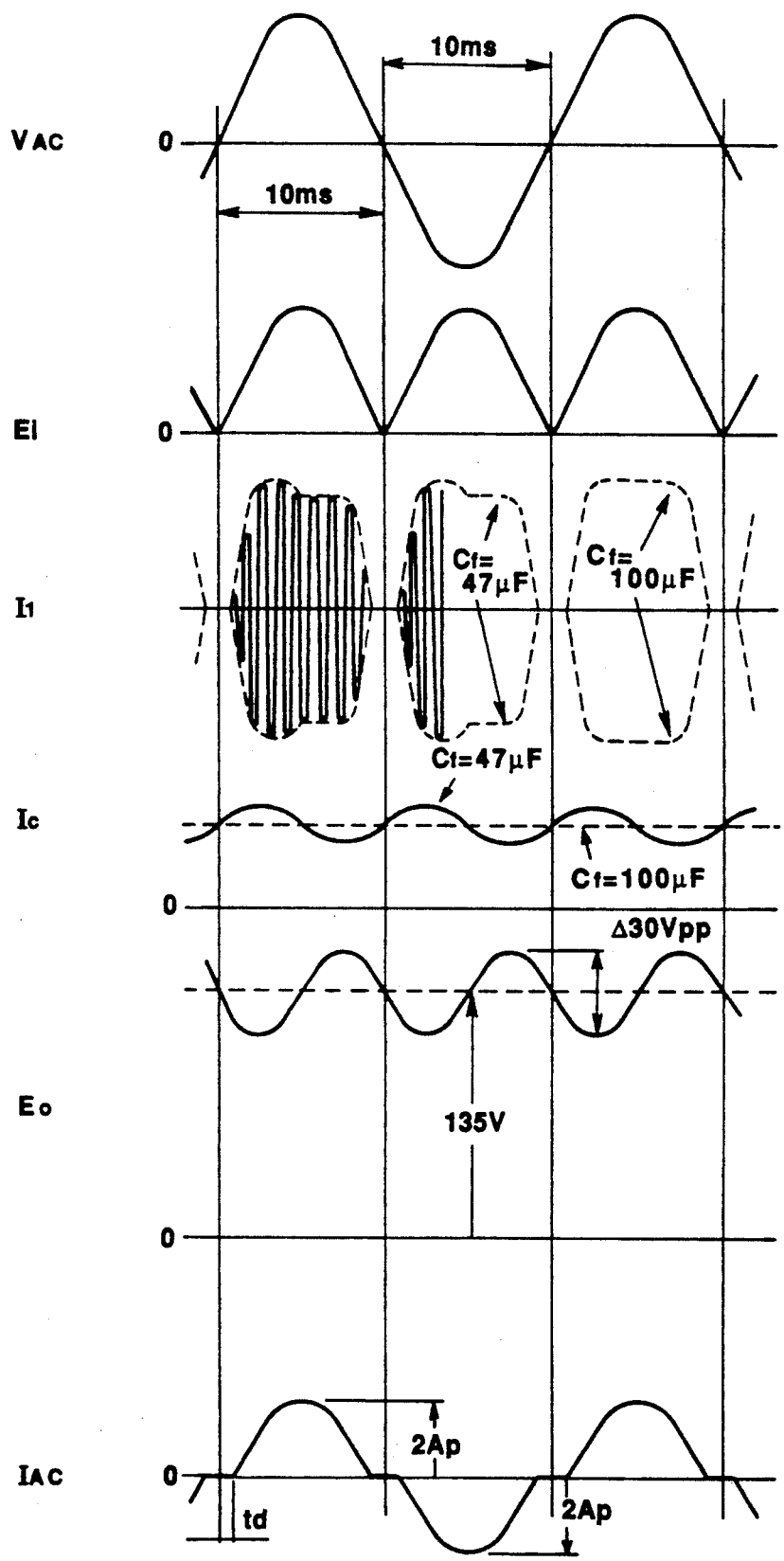
FIG. 3 is a waveform diagram showing electrical current and voltage at various points of the circuit shown in FIG. 1.

The schematic operation of the above described switching power source device is hereinafter explained. An ac output from e.g. the 100 V commercial power source 1 is rectified and smoothed by the diode bridge type full-wave rectifier 2 and the small-capacity capacitor 3. With the capacitance of the small capacity capacitor 3 of 0.1 to 0.22 μF, the dc input voltage $E_i$ is derived from a sinusoidal pulsating wave as shown in FIG. 3 and is supplied to the power source regulating transformer 7 shown in FIG. 7 via the resonance converter circuit 4 and the converter driven transformer 5. The controller 9 detects an average value of the dc output voltage produced at the secondary winding $N_2$ of the power source regulating transformer 7 and controls the dc controlling current $I_c$ flowing through the control winding $N_c$ so that the average value will be constant.

The above-mentioned dc output voltage contains a ripple voltage determined by the capacitance of a smoothing capacitor $C_0$ of the rectifying smoothing capacitor 8 and the load power. Since the sc input current $I_{AC}$ is controlled so as to have a waveform approximately similar to the ac input voltage $V_{AC}$, this ripple voltage becomes the sinusoidal voltage $E_0$ having the frequency double the frequency of the ac input voltage $V_{AC}$.

Figure 4:
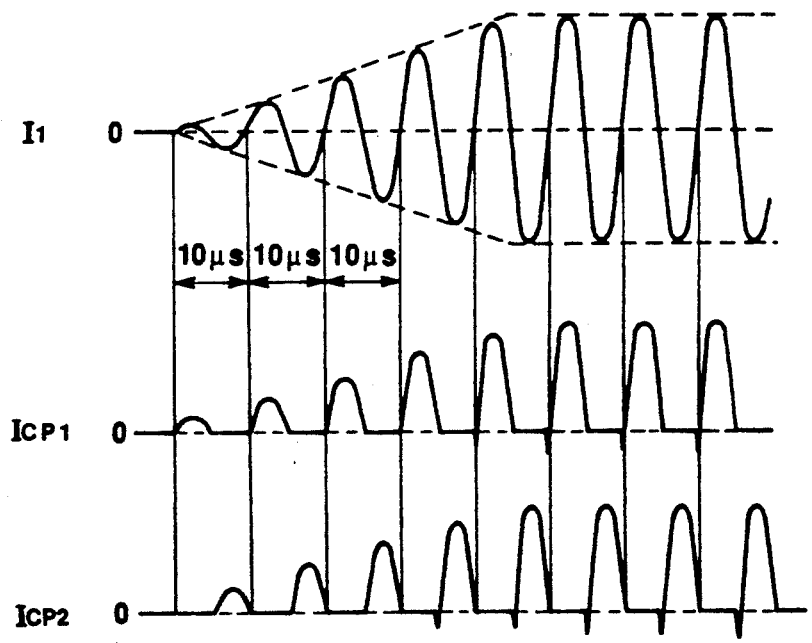
FIG. 4 is a waveform diagram showing the high frequency sinusoidal current $I_1$ shown in FIG. 3 and the current flowing through a switching transistor.

The switching frequencies of the switching transistors $Q_1$, $Q_2$ of the resonant converter circuit 4 are fixed by the secondary winding $N_{B1}$, resistor $R_{B1}$ and the capacitor $C_{B1}$ and by the secondary winding $N_{B2}$, resistor $R_{B2}$ and the capacitor $C_{B2}$, respectively. Thus the high frequency sinusoidal current $I_1$, shown in FIG. 4, generated by the series resonant circuit constituted by the series resonant capacitor 6 and the stray inductance of the primary winding $N_1$ of the power source regulating transformer 7, are caused to flow through the switching transistors $Q_1$, $Q_2$, as switching currents $I_{CP1}$, $I_{CP2}$, respectively.

It is noted that, if the input voltage is 10 V or less, the high frequency sinusoidal wave does not flow, so that a dead time $t_d$ as shown in FIG. 3 is produced. Thus the ac input current $I_{AC}$ is interrupted. However, the power factor is substantially not lowered because the load power in not affected significantly by the input power in the vicinity of the zero-crossing points.

According to our experiments, if, in the embodiment shown in FIG. 1, the load power is set to 150 W, the switching frequency is set to 100 kHz, the small-capacity smoothing capacitor $C_i$ is set to 0.22 μF/200 V, the rectifying smoothing electrolytic capacitor $C_0$ of the rectifying smoothing capacitor 8 is 100 μF/160 V, the rectifying smoothing electrolytic capacitor $C_0'$ of the rectifying smoothing capacitor 8 is 1000 μF/25 V, and the feedback capacitor $C_f$ of the controller 9 is 47 μF/6.3 V, the operating waveform is as shown in FIG. 3, with the power factor being 0.96. The harmonic distortion of the ac input current $I_{AC}$ is diminished and the ac input voltage is improved to a sinusoidal waveform.

The larger the capacitance of the feedback capacitor $C_f$ controlling the average value of the dc output voltage to a constant value, the closer becomes the envelope of the high frequency sinusoidal current $I_1$ to a trapezoidal form. Since the transient response characteristics due to abrupt load changes are determined by the time constant of the detecting resistor $R_1$ and the feedback resistor $C_f$, the fast follow-up time would be prolonged if the feedback capacitor $C_f$ is selected to too high a value.

Figure 7:
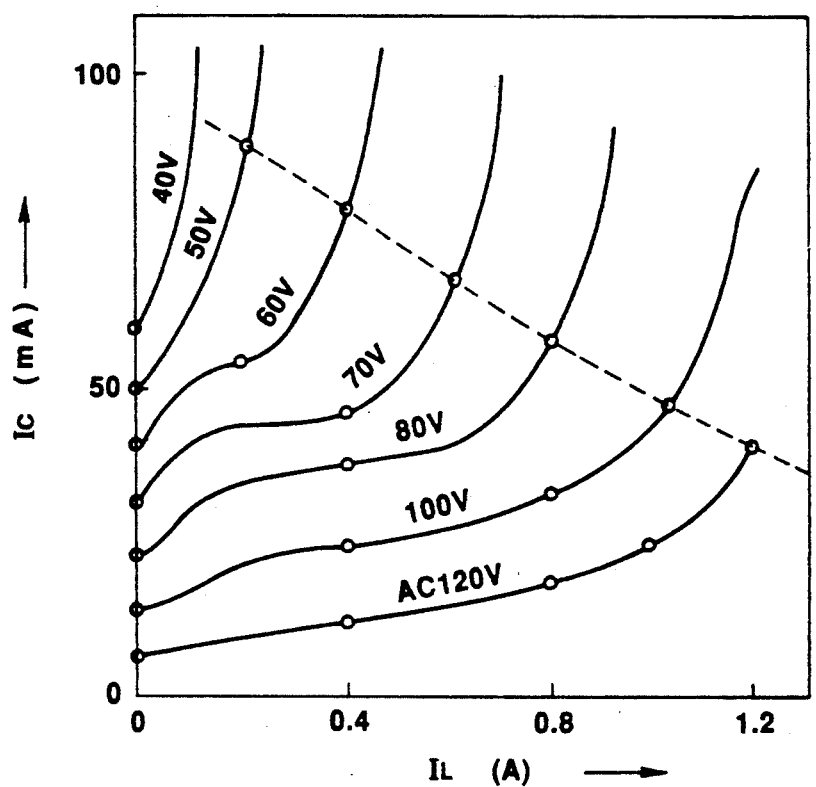
FIG. 7 is a graph showing controlling characteristics of the controlling current of the power source regulating transformer against changes in the main load current for various ac input voltages.

The control characteristics of the controlling current $I_c$ with respect to the main load current $I_L$ are shown in FIG. 7 for various ac input voltages, wherein the main load current $I_L$ is plotted on the abscissa and the controlling current $I_c$ of the power source regulating transformer 7 is plotted on the ordinate. If, with the constant main load current $I_L$, the controlling current $I_C$ for the power source regulating transformer 7 is compared to the ac input voltage, the controlling current $I_c$ becomes the smaller the larger the ac input voltage. An area towards the origin O from a line connecting points a and b in the drawing represents a constant voltage area.

Figure 8:
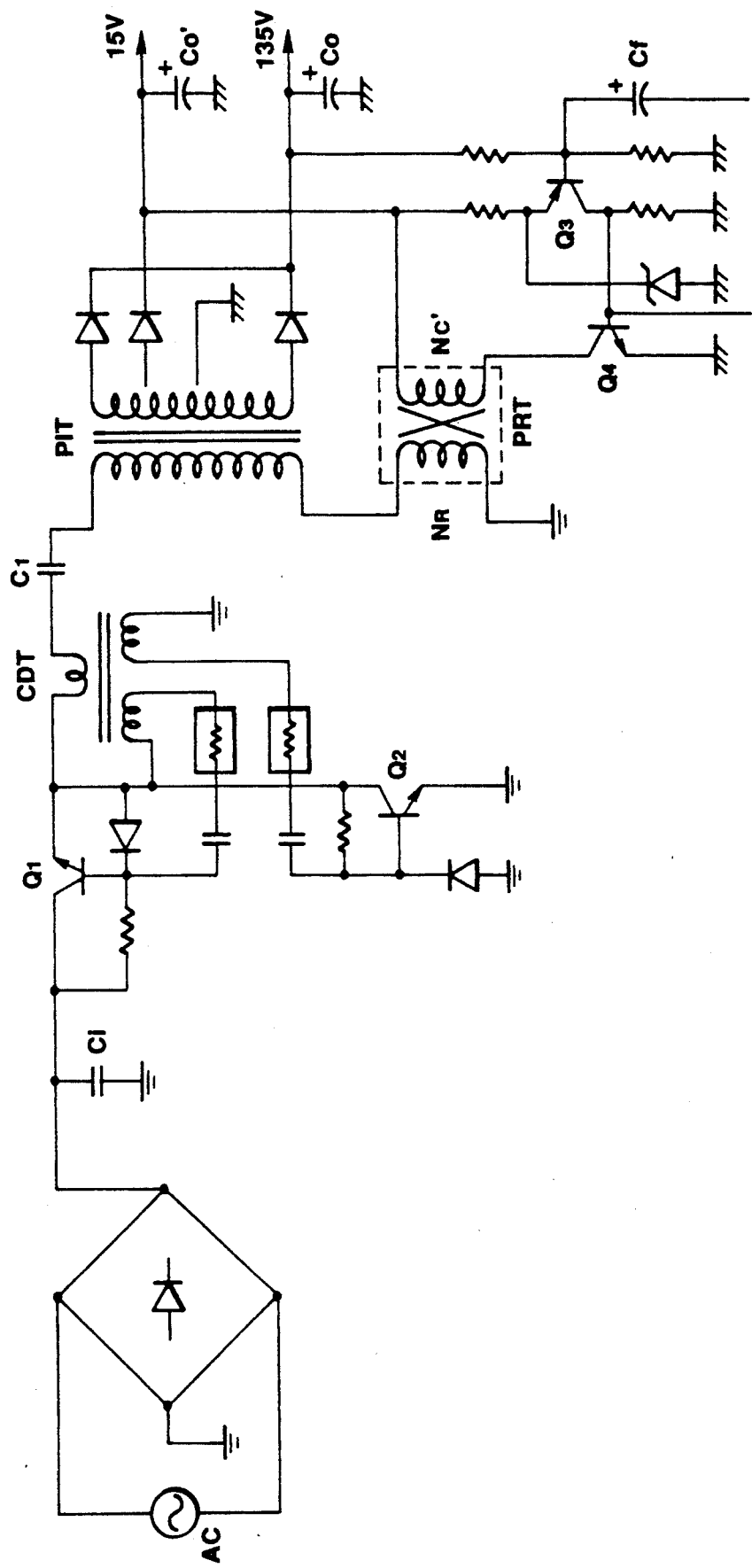
FIG. 8 is a circuit diagram showing a switching power source device according to a modified embodiment of the present invention.
Figure 9:
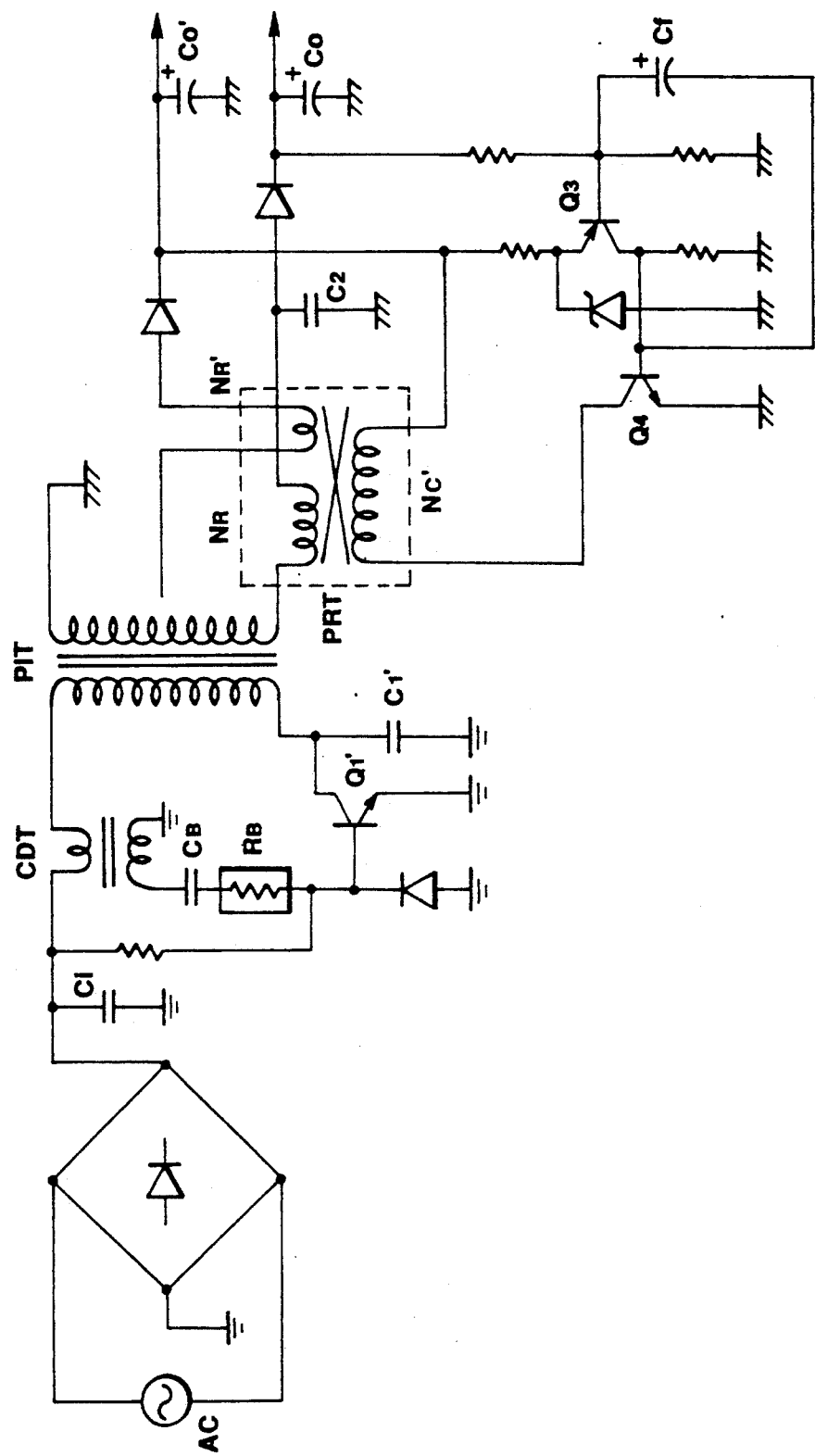
FIG. 9 is a circuit diagram showing a switching power source device according to another modified embodiment of the present invention.

FIGS. 8 and 9 illustrate modified embodiments of the present invention. Specifically, FIG. 8 illustrates a switching power source circuit for improving the power factor wherein a power source insulating transformer is annexed and a transformer circuit is designed as a saturable reactor transformer for controlling the primary side inductance. FIG. 9 illustrates a switching power source circuit for improving the power factor by a secondary side inductance control type voltage resonance converter having a fixed switching frequency in case of low loads. FIG. 6 shows a transformer circuit used in other modifications of the present invention, including windings $N_R$ and $N_C'$ shown in FIGS. 8 and 9.

Thus it is possible with the above-described embodiments to improve the power factor and to diminish the harmonic distortion of the commercial power source by the rectifying smoothing circuit employing the small-capacitance capacitor and the resonance frequency control type converter circuit.

What is claimed is:

1. A switching power source device comprising:
    a rectifying smoothing circuit including a small-capacitance capacitor as a circuit for rectifying and smoothing a commercial ac input power source,
    a resonant frequency controlled type resonant converter circuit including a self-oscillating circuit for switching controlling of an output of said rectifying smoothing circuit with a fixed switching frequency,
    a converter-driven transformer having a primary circuit and a secondary circuit, said secondary circuit being connected to said resonant converter circuit for on-off control of the rectified and smoothed input power source,
    a power-source regulating transformer circuit section including a primary circuit connected to said primary winding of said converter-driven transformer, a secondary winding insulated with respect to said primary winding, and a control winding having the direction of winding at right angles to the winding direction of said primary and secondary windings,
    a controller for controlling the control current of said control winding of said power-source regulating transformer circuit section in a direction of rendering the average value of the dc output voltage of said transformer circuit section constant, and
    a rectifying smoothing circuit including a rectifying smoothing capacitor determining the ripple voltage of the dc output voltage of said transformer circuit section in conjunction with a load power.

2. A switching power source device as claimed in claim 1 wherein a power source insulating transformer is added to said transformer circuit section for controlling the primary side inductance as a saturable reactor transformer.

* * * * *